United States Patent
Shiono et al.

(10) Patent No.: US 8,837,265 B2
(45) Date of Patent: Sep. 16, 2014

(54) OPTICAL INFORMATION REPRODUCTION DEVICE, OPTICAL INFORMATION REPRODUCTION METHOD, AND INFORMATION RECORDING MEDIUM

(75) Inventors: Teruhiro Shiono, Osaka (JP); Yoshiharu Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/816,046

(22) PCT Filed: Aug. 18, 2011

(86) PCT No.: PCT/JP2011/004615
§ 371 (c)(1),
(2), (4) Date: Feb. 8, 2013

(87) PCT Pub. No.: WO2012/026096
PCT Pub. Date: Mar. 1, 2012

(65) Prior Publication Data
US 2013/0135982 A1    May 30, 2013

(30) Foreign Application Priority Data
Aug. 23, 2010  (JP) ................... 2010-186378

(51) Int. Cl.
| | | |
|---|---|---|
| G11B 7/00 | (2006.01) | |
| G11B 7/24 | (2013.01) | |
| G11B 7/1387 | (2012.01) | |
| B82Y 30/00 | (2011.01) | |
| B82Y 20/00 | (2011.01) | |
| G11B 7/005 | (2006.01) | |
| G11B 7/2538 | (2013.01) | |
| G11B 7/2532 | (2013.01) | |
| G11B 7/2533 | (2013.01) | |
| G11B 7/2531 | (2013.01) | |

(52) U.S. Cl.
CPC ............... *G11B 7/1387* (2013.01); *B82Y 30/00* (2013.01); *B82Y 20/00* (2013.01); *G11B 7/2538* (2013.01); *G11B 7/2532* (2013.01); *G11B 7/005* (2013.01); *G11B 7/2533* (2013.01); *G11B 7/2531* (2013.01)

USPC ................ 369/53.2; 369/100; 369/112.01; 369/275.4

(58) Field of Classification Search
None
See application file for complete search history.

(56) References Cited

U.S. PATENT DOCUMENTS 5,049,462 A * 9/1991 Funhoff et al. ............... 369/100
5,463,609 A * 10/1995 Inagaki et al. .......... 369/112.28
(Continued)

FOREIGN PATENT DOCUMENTS

JP    6-139620    5/1994
JP    9-282724    10/1997
(Continued)

OTHER PUBLICATIONS

International Search Report issued Nov. 22, 2011 in International (PCT) Application No. PCT/JP2011/004615.

*Primary Examiner* — Thang Tran
(74) *Attorney, Agent, or Firm* — Wenderoth, Lind & Ponack, L.L.P.

(57) ABSTRACT

An optical information reproduction device includes a light source (14) configured to emit reproduction light, a plasmon resonance element (9) including a resonance section (22) arranged adjacent to a recording region (4) of a recording layer (2), the resonance section (22) causing plasmon resonance between the recording region (4) and the resonance section (22), a photodetector (17a) configured to detect reflected light or transmitted light from the plasmon resonance element (9) on which the reproduction light is irradiated, and a reproduction unit (24) configured to determine, on the basis of a detection signal from the photodetector (17a), whether the recording region (4) is in a recorded state or an unrecorded state, and reproduce information recorded in the recording region (4).

23 Claims, 10 Drawing Sheets

(56) References Cited

U.S. PATENT DOCUMENTS

| | | |
|---|---|---|
| 5,582,896 A | 12/1996 | Kuwamoto et al. |
| 5,614,279 A | 3/1997 | Kuwamoto et al. |
| 6,197,399 B1 | 3/2001 | Naito et al. |
| 6,768,556 B1 | 7/2004 | Matsumoto et al. |
| 2003/0066944 A1 | 4/2003 | Matsumoto et al. |
| 2005/0069732 A1 | 3/2005 | Kamata et al. |
| 2009/0269542 A1 | 10/2009 | Shima et al. |
| 2012/0155232 A1* | 6/2012 | Schreck et al. ............ 369/13.33 |

FOREIGN PATENT DOCUMENTS

| | | |
|---|---|---|
| JP | 11-328725 | 11/1999 |
| JP | 2001-255254 | 9/2001 |
| JP | 2003-114184 | 4/2003 |
| JP | 2003-217172 | 7/2003 |
| JP | 2005-108335 | 4/2005 |
| WO | 2008/035522 | 3/2008 |

\* cited by examiner

OPTICAL INFORMATION REPRODUCTION DEVICE, OPTICAL INFORMATION REPRODUCTION METHOD, AND INFORMATION RECORDING MEDIUM

TECHNICAL FIELD

The present invention relates to an optical information reproduction device and an optical information reproduction method for optically reproducing information recorded on an information recording medium, and also relates to an information recording medium including at least a substrate and a recording layer.

BACKGROUND ART

As an optical information reproduction device, an optical memory system has been put to practical use in which an optical disk such as a CD (compact disc), a DVD, or a BD (Blu-Ray disc), an optical card, or the like is used as an information recording medium.

A reproduction principle of a conventional optical memory system is shown in FIG. 10 in a simplified form. FIG. 10 is an explanatory diagram showing a part of the configuration of a conventional optical information recording and reproduction device and a state in which information is reproduced from an information recording medium.

In the conventional optical information recording and reproduction device, reproduction light 107 from a light source (not shown in the figure) is condensed by an objective lens 110. The reproduction light 107 is irradiated, as irradiation light 105, on a recording mark 104, which is a recording region in which information is recorded, of a recording film 102 formed on a substrate 101 of an information recording medium 103. Reflected lights 106 and 108 from the recording mark 104 are detected, whereby the information is reproduced from the information recording medium 103. For example, if reflectance is set to be low if the recording mark 104 is in a recorded state and is set to be high if the recording mark 104 is an unrecorded state, the optical information recording and reproduction device can determine whether the recording mark 104 is in the recorded state or the unrecorded state and can reproduce optical information of the information recording medium 103 by detecting light amounts of the reflected lights 106 and 108.

However, in the optical memory system in the past, there is a problem in that the size (recording mark length) of a recording mark that can be reproduced is limited by an optical limit size called diffraction limit determined by an NA (numerical aperture) of the objective lens and the wavelength of reproduction light and a further increase in density is difficult.

In recent years, in order to eliminate the diffraction limit, an optical memory is proposed in which near-field light, a spot diameter of which can be set smaller than the diffraction limit, is used. Patent Literature 1 describes an optical recording and reproduction device in which a near-field light probe made of a microstructure of metal is used.

In the optical recording and reproduction device described in Patent Literature 1, a recording layer of a phase-change recording medium is subjected to phase change from crystal to amorphous by near-field light generated by the near-field light probe, whereby a recording mark is formed and recording is performed. The near-field light is irradiated on the phase-change recording medium on which the recording mark is formed and reproduction is performed by detecting a change in the intensity of scattered light returned from the phase-change recording medium. Since the near-field light is localized light exponentially attenuated as it is further apart from a generation source (light that does not propagate), in general, the near-field light cannot be extracted. However, a small fraction of the near-field light can be extracted as scattered light by bringing an object such as the recording mark close to the near-field light. Specifically, when the near-field light is irradiated on the recording mark of the phase-change recording medium, a rate of scattering of the near-field light changes according to presence or absence of the recording mark. Therefore, in the optical recording and reproduction device described in Patent Literature 1, reproduction is performed by detecting a change in the intensity of the scattered light from the recording mark.

However, as a result of examination, the inventors have found a problem in the optical recording and reproduction device described in Patent Literature 1 in that, although high-density recording can be performed by forming a recording mark having size close to the size of the near-field light (e.g., about several ten nanometers), it is difficult to satisfactorily reproduce a recording mark having the size of the near-field light.

According to the study by the inventors, besides low conversion efficiency from reproduction light (propagated light) into near-field light (in general, only about 1%), when size d of the recording mark is smaller than the diffraction limit and reduced to size of a so-called Rayleigh scattering region (with respect to wavelength $\lambda$, $d \leq \sim \lambda/10$, for example, when $\lambda=405$ nm, $d \leq \sim 40$ nm), even if the near-field light can be condensed to size close to the size d of the recording mark and irradiated on the recording mark, a light amount of returning scattered light suddenly decreases as the size d is smaller. For example, the inventors have estimated through optical calculation that, in a recording mark having size of about 20 nm, a light amount of returning scattered light is, for example, about 0.001% with respect to a light amount of the irradiated near-field light and, with respect to a light amount of reproduction light, the light amount of the returning scattered light is only about 1% of the abovementioned value, i.e., about 0.00001% at most.

As a result, there is a problem in that a change in the intensity of scattered light detected according to presence or absence of the recording mark is, for example, smaller than 0.00001% with respect to the reproduction light amount and reproduction of information is difficult because the change in the intensity of the scattered light is too small.

CITATION LIST

Patent Literature

Patent Literature 1: Japanese Patent Application Laid-Open No. 2003-114184

SUMMARY OF THE INVENTION

The present invention has been devised in order to solve the problems and it is an object of the present invention to provide an optical information reproduction device, an optical information reproduction method, and an information recording medium capable of satisfactorily reproducing information even if the size of a recording region in which the information is recorded is smaller than a diffraction limit of light.

An optical information reproduction device according to an aspect of the present invention is an optical information reproduction device that reproduces information recorded on an information recording medium including at least a substrate and a recording layer, the optical information reproduction device including: a light source configured to emit reproduction light; a plasmon resonance element including a resonance section arranged adjacent to a recording region of the recording layer, the resonance section causing plasmon resonance between the recording region and the resonance section; a photodetector configured to detect reflected light or transmitted light from the plasmon resonance element on which the reproduction light is irradiated; and a reproduction unit configured to determine, on the basis of a detection signal from the photodetector, whether the recording region is in a recorded state or an unrecorded state, and reproduce information recorded in the recording region.

With this configuration, the reproduction light emitted from the light source is irradiated on the plasmon resonance element, the reflected light or the transmitted light from the plasmon resonance element is detected, it is determined on the basis of the detection signal whether the recording region is in the recorded state or the unrecorded state, and the information recorded in the recording region is reproduced.

According to the present invention, even if the size of the recording region is smaller than the diffraction limit of light, it is possible to satisfactorily reproduce the information by making use of the fact that a plasmon resonance degree between the recording region and the resonance section of the plasmon resonance element changes according to a state of the recording region, whereby a reflected light amount or a transmitted light amount from the plasmon resonance element changes.

Since the size of the plasmon resonance element is not subjected to a spatial limitation, it is possible to form the plasmon resonance element larger than the recording region. Further, the reflected light or the transmitted light from the plasmon resonance element is detected by directly irradiating the reproduction light on the plasmon resonance element rather than near-field light. Therefore, it is possible to set the reflected light amount, the transmitted light amount, a light amount change of the reflected light amount, or a light amount change of the transmitted light amount sufficiently large. It is possible to improve a modulation degree of a reproduction signal.

Objects, characteristics, and advantages of the present invention are made apparent by the following detailed description and accompanying drawings.

DESCRIPTION OF EMBODIMENTS

Embodiments of the present invention are explained below with reference to the drawings. The embodiments explained below are embodied examples of the present invention and are not meant to limit the technical scope of the present invention.

First Embodiment

First, an optical information reproduction device, an optical information reproduction method, and an information recording medium in a first embodiment of the present invention are explained in detail with reference to FIGS. 1, 2, 3A, and 3B.

Figure 1:
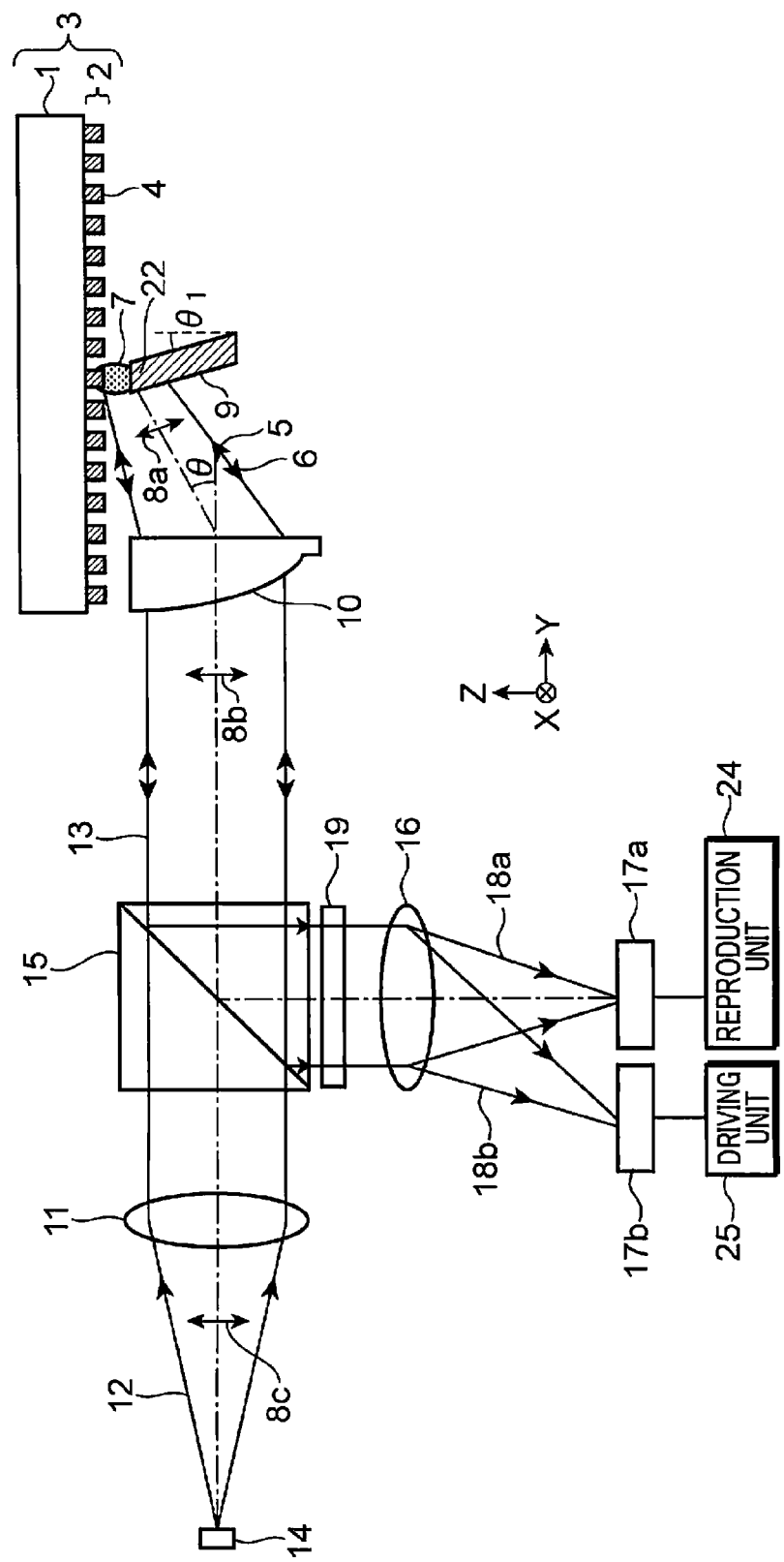
FIG. 1 is a diagram showing the configuration of an optical information reproduction device in a first embodiment of the present invention.
Figure 2:
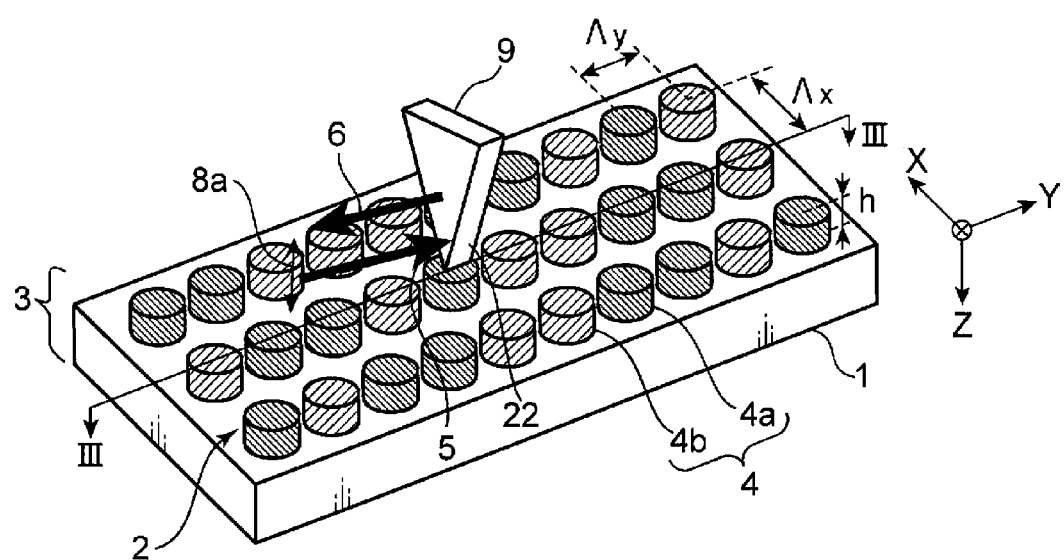
FIG. 2 is an explanatory diagram showing a plasmon resonance element of the optical information reproduction device in the first embodiment of the present invention and a state in which information is reproduced from an information recording medium.
Figure 3A:
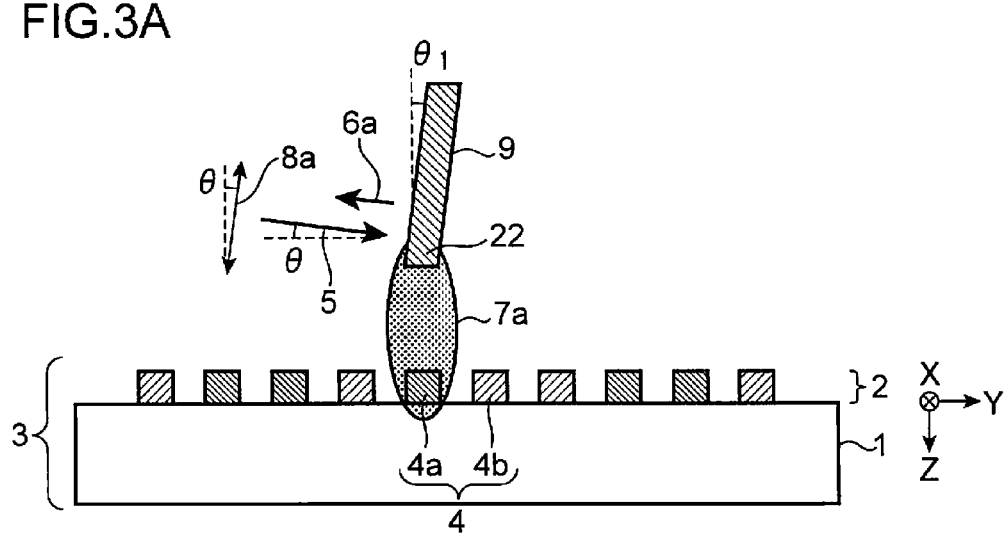
FIG. 3A is a sectional view taken along line III-III in FIG. 2 showing a state of the vicinity of the plasmon resonance element in the case in which, in the first embodiment of the present invention, a recording region of the information recording medium is in a recorded state and a plasmon resonance degree is large.
Figure 3B:
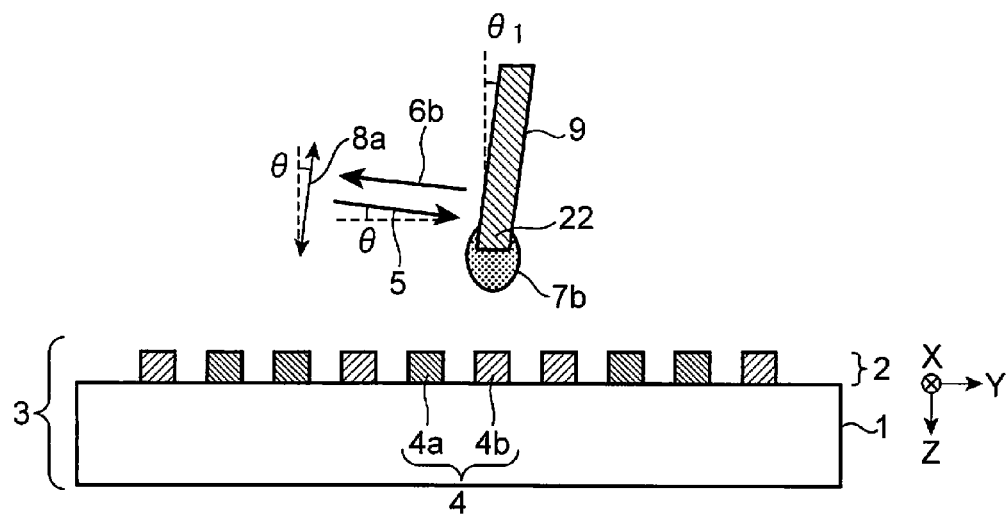
FIG. 3B is a sectional view taken along line III-III in FIG. 2 showing a state of the vicinity of the plasmon resonance element in the case in which, in the first embodiment of the present invention, the recording region of the information recording medium is in an unrecorded state and the plasmon resonance degree is small.

FIG. 1 is a diagram showing the configuration of an optical information reproduction device in a first embodiment of the present invention. FIG. 2 is an explanatory diagram showing a plasmon resonance element of the optical information reproduction device in the first embodiment of the present invention and a state in which information is reproduced from an information recording medium. FIG. 3A is a sectional view taken along line III-III in FIG. 2 showing a state of the vicinity of the plasmon resonance element in the case in which, in the first embodiment of the present invention, a recording region of the information recording medium is in a recorded state and a plasmon resonance degree is large. FIG. 3B is a sectional view taken along line III-III in FIG. 2 showing a state of the vicinity of the plasmon resonance element in the case in which, in the first embodiment of the present invention, the recording region of the information recording medium is in an unrecorded state and the plasmon resonance degree is small.

The optical information reproduction device in the first embodiment is an optical information reproduction device that reproduces information recorded on an information recording medium 3 including at least a substrate 1 and a recording layer 2. The optical information reproduction device includes a light source 14 configured to emit reproduction light, a plasmon resonance element 9 including a resonance section 22 arranged adjacent to a recording region 4 of the recording layer 2, the resonance section 22 causing plasmon resonance between the recording region 4 and the resonance section 22, a photodetector 17a configured to detect reflected light 6 (or transmitted light) from the plasmon resonance element 9 on which the reproduction light is irradiated, and a reproduction unit 24 configured to determine, on the basis of a detection signal from the photodetector 17a, whether the recording region 4 is in a recorded state or an unrecorded state, and reproduce information recorded in the recording region 4.

An optical information reproduction method in the first embodiment is an optical information reproduction method for reproducing information from an information recording medium 3 including at least a substrate 1 and a recording layer 2. The optical information reproduction method includes a step of irradiating (irradiation light 5) reproduction light emitted from a light source 14 on a plasmon resonance element 9 including a resonance section 22 arranged adjacent to a recording region 4 of the recording layer 2, the resonance section 22 causing plasmon resonance between the recording region 4 and the resonance section 22, a step of detecting, with a photodetector 17a, the reflected light 6 (or transmitted light) from the plasmon resonance element 9 on which the reproduction light is irradiated, and a step of determining, on the basis of a detection signal from the photodetector 17a, whether the recording region 4 is in the recorded state or the unrecorded state, and reproducing information recorded in the recording region 4.

The optical information reproduction device in the first embodiment is explained in detail. The optical information reproduction device shown in FIG. 1 includes a plasmon resonance element 9, an objective lens 10, a collimator lens 11, a light source 14, a beam splitter 15, a detection lens 16, photodetectors 17a and 17b, an optical element for servo signal detection 19, the reproduction unit 24, and a driving unit 25.

The light source 14 emits reproduction light. The plasmon resonance element 9 includes a resonance section 22. The resonance section 22 causes plasmon resonance between a recording region 4 of a recording layer 2 and the resonance section 22. The resonance section 22 is arranged adjacent to the recording region 4. The photodetector 17a detects reflected light from the plasmon resonance element 9 on which the reproduction light is irradiated. The reproduction unit 24 determines on the basis of a detection signal from the photodetector 17a whether the recording region 4 is in the recorded state or the unrecorded state, and reproduces information recorded in the recording region 4.

As shown in FIG. 1, the optical information reproduction device in the first embodiment includes a semiconductor laser light source as the light source 14 for reproduction. In an optical path from the light source 14 to an information recording medium 3, the collimator lens 11, the beam splitter 15, the objective lens 10, and the plasmon resonance element 9 are arranged. In a return optical path from the beam splitter 15 to the photodetectors 17a and 17b, the optical element for servo signal detection 19 and the detection lens 16 are arranged.

The information recording medium 3 includes at least a substrate 1 and the recording layer 2. A plurality of recording regions 4 in which information is recorded are provided on the substrate 1 as the recording layer 2. One recording region 4 is in the recorded state or the unrecorded state.

The resonance section 22 in a distal end region of the plasmon resonance element 9 is arranged adjacent to the recording region 4 such that a distance between the resonance section 22 and the recording region 4 is, for example, within about 100 nm, desirably, about 5 to 30 nm. The plasmon resonance element 9 only has to be arranged in a position where plasmon resonance with the resonance section 22 occurs or intensification of the plasmon resonance occurs when the recording region 4 is in at least one of the recorded state and the unrecorded state.

The reproduction light emitted from the light source 14 is irradiated on the plasmon resonance element 9. In the first embodiment, laser light (emitted light of the reproduction light) 12 polarized linearly in a Z-axis direction (a polarization direction 8c) is emitted from the light source 14 in a Y-axis direction. It is changed to substantially parallel light 13 (a polarization direction 8b) by the collimator lens 11 and transmitted through the beam splitter 15. The laser light transmitted through the beam splitter 15 is condensed by the objective lens 10 on the plasmon resonance element 9 as the irradiation light 5 centering on the vicinity of the resonance section 22 at the distal end and including the recording region 4 and the like in a region close to the resonance section 22. A polarization direction 8a indicates a polarization direction on an optical axis of the irradiation light 5.

As explained above, the reproduction light is irradiated on the recording region 4 adjacent to the resonance section of the plasmon resonance element 9 as well. Therefore, the plasmon resonance is further intensified. Consequently, a difference in a reflected light amount between the recorded state and the unrecorded state increases and detection sensitivity is improved.

The reflected light 6 reflected by the plasmon resonance element 9 turns back in the opposite direction and passes through the objective lens 10. The reflected light 6 passed through the objective lens 10 is made incident on the optical element for servo signal detection 19 with an optical axis thereof bent in a −Z-axis direction by the beam splitter 15. The reflected light 6 is divided into at least two lights by the optical element for servo signal detection 19 and divided into two kinds of convergent lights 18a and 18b by the detection lens 16.

The convergent light 18a to be reproduction signal light is made incident on the photodetector 17a. The photodetector 17a detects a signal recorded in the recording region 4. The reproduction unit 24 determines on the basis of a detection signal from the photodetector 17a whether the recording region 4 is in the recorded state or the unrecorded state, and reproduces the information recorded in the recording region 4. The convergent light 18b is made incident on the other photodetector 17b. The photodetector 17b detects a servo signal. The optical information reproduction device in this embodiment includes the driving unit 25 that integrally moves the plasmon resonance element 9 and the objective lens 10. The driving unit 25 moves the plasmon resonance element 9 on the basis of the servo signal from the photodetector 17b to thereby perform control of a very small position including, for example, a space between the plasmon resonance element 9 and the recording layer 2.

The objective lens 10 is a condensing lens of a so-called off-axis type. When the substantially parallel light 13, the optical axis of which is parallel to the Y-axis direction, is made incident on the objective lens 10, emitted light, the optical axis of which inclines by an angle θ in the Z-axis direction from the Y axis on a YZ plane, is condensed. Since the objective lens 10 of the of axis type is used, there is an effect of preventing contact of the objective lens 10 and the information recording medium 3 and making it easy to condense the reproduction light in the vicinity of the resonance section 22 of the plasmon resonance element 9 from an oblique lateral direction.

The plasmon resonance element 9 is made of metal such as Au and has a triangular prism shape pointed at an end as shown in FIG. 2. The plasmon resonance element 9 is arranged to be tilted by an angle $\theta_1$ with respect to a ZX plane in a state in which the resonance section 22 at the distal end is provided adjacent to the recording region 4 of the recording layer 2.

Besides the triangular shape described above, the plasmon resonance element 9 only has to have a shape pointed at an end to allow plasmon resonance to easily occur. The overall shape of the plasmon resonance element 9 may be any shape.

The plasmon resonance element 9 desirably has a flat section. In this embodiment, $\theta$ is set nearly equal to $\theta_1$ ($\theta \cong \theta_1$) such that the triangular flat section of the plasmon resonance element 9 is substantially perpendicular to the optical axis of the irradiation light 5. Consequently, it is possible to reflect the irradiation light 5 on the flat section of the plasmon resonance element 9 as reflected light 6 in the opposite direction at substantially the same angle. This is desirable because efficiency of light utilization increases. In order to irradiate the irradiation light 5, which is the reproduction light, on the flat section of the plasmon resonance element 9 and satisfactorily extract the reflected light 6, the area of the flat section is hundred to about several thousand square nanometer or larger than several thousand square nanometers.

According to the irradiation of the irradiation light 5, electrons present in the plasmon resonance element 9 interact with the irradiation light 5, induce (surface) plasmon resonance, and cause near-field light 7 in the resonance section 22 in the distal end region according to the induction of the plasmon resonance. The inventors have found that, at this point, when the recording region 4 and the resonance section 22 close to each other interact, a condition for causing further intensified plasmon resonance is present, and the plasmon resonance is intensified, a light amount of the reflected light 6 from the plasmon resonance element 9 changes.

According to a degree of the plasmon resonance between the resonance section 22 of the plasmon resonance element 9 and the recording region 4 in the recorded state or the recording region 4 in the unrecorded state, a reflected light amount from the plasmon resonance element 9 changes. For example, the change in the reflected light amount from the plasmon resonance element 9 is larger when a degree of plasmon resonance between the resonance section 22 of the plasmon resonance element 9 and a recording region 4a in the recorded state or a recording region 4b in the unrecorded state is larger.

FIGS. 3A and 3B are examples in which a degree of plasmon resonance is larger in a recording region 4a in the recorded state than in a recording region 4b in the unrecorded state. FIG. 3A shows a case in which the resonance section 22 of the plasmon resonance element 9 is present on the recording region 4a in the recorded state. In FIG. 3A, near-field light 7a is generated between the resonance section 22 and the recording region 4a and the plasmon resonance degree increases. As a result, a light amount of reflected light 6a changes (in FIG. 3A, decreases). FIG. 3B shows a case in which the resonance section 22 of the plasmon resonance element 9 is present on the recording region 4b in the unrecorded state. In FIG. 3B, near-field light 7b is generated only in the vicinity of the resonance section 22 and the plasmon resonance degree decreases. As a result, the light amount of reflected light 6b hardly changes.

It is considered that, when the plasmon resonance between the plasmon resonance element 9 and the recording region 4 is intensified, a dielectric loss (absorption) increases in the plasmon resonance element 9. As a result, the reflected light amount from the plasmon resonance element 9 changes. However, depending on the design of the plasmon resonance element 9, when the plasmon resonance is intensified, the reflected light amount decreases in some case and increases in other cases.

A polarization state such as a polarization angle of reflected light or transmitted light from the plasmon resonance element 9 sometimes changes according to the plasmon resonance degree. In this case, it is possible to change the change in the polarization state to a light amount change of the reflected light or the transmitted light by combining an optical element such as an analyzer with the plasmon resonance element 9. Therefore, it is possible to reproduce information in the same manner by detecting, with a photodetector, emitted light from the optical element such as the analyzer.

Even if the size of the recording region 4 is equal to or smaller than a diffraction limit, it is possible to change a degree of plasmon resonance according to whether the recording region 4 is in the recorded state or the unrecorded state. Therefore, the reflected light 6 is detected by the photodetector 17a and it is determined on the basis of a detection signal from the photodetector 17a whether the recording region 4 is in the recorded state or the unrecorded state, whereby the information recorded in the recording region 4 can be reproduced. For example, "1" (or "0") is associated with the recorded state and "0" (or "1") is associated with the unrecorded state. The recorded information is reproduced according to a combination of "1" and "0".

It is known that a polarization direction of the irradiation light 5 is important for plasmon resonance and intensification of the plasmon resonance and the plasmon resonance more often occurs as the longitudinal direction of the plasmon resonance element 9 in which electrons are present and the polarization direction 8a of the irradiation light 5 are closer to parallel. Therefore, in the arrangement shown in FIG. 1, it is desirable to set $\theta$ equal to $\theta_1$ ($\theta = \theta_1$). If a polarization component of the irradiation light 5 with respect to the longitudinal direction of the plasmon resonance element 9 is present as in the case of, for example, $\theta_1 = 0$ or $\theta \ne \theta_1$, the plasmon resonance occurs.

At this point, for the resonance section 22 to interact with the recording region 4 to intensify the plasmon resonance, the light source 14 is desirably arranged on the optical axis of the irradiation light 5 irradiated on the plasmon resonance element 9 to have a characteristic that the amplitude of a polarization component of reproduction light polarizing in the perpendicular direction (the Z-axis direction) with respect to an arrangement surface (an XY plane) of the recording layer 2 is larger than the amplitude of a polarization component of reproduction light polarizing in another polarization direction (the Y-axis direction). For example, the light source 14 is arranged such that an angle $\theta$ formed by the optical axis of laser light made incident on the objective lens 10 and the optical axis of laser light made incident on the plasmon resonance element 9 satisfies $0° \le \theta < 45°$ and reproduction light polarized linearly in the Z-axis direction is emitted in the Y-axis direction (FIG. 1).

In the first embodiment, for example, the angle $\theta$ is set in a range of 10° to 30° such that the reproduction light has a little oblique component ($\theta > 0°$). As a result, the irradiation light 5 can be irradiated obliquely to include the recording region 4 and the like in the region close to the resonance section 22. This is desirable for intensification of the plasmon resonance.

In an optical path between the light source 14 and the objective lens 10, for example, a polarization control optical element like a wave plate that converts a polarization state of the emitted light 12 or 13 emitted from the light source 14 may be arranged. The polarization control optical element increases the amplitude of the polarization component of the reproduction light polarizing in the perpendicular direction (the Z-axis direction) with respect to the arrangement surface (the XY plane) of the recording layer 2 to be larger than the amplitude of the polarization component of the reproduction light polarizing in the other polarization direction (the Y-axis direction). For example, when the polarization direction from the light source 14 to the emitted light 12 is the X-axis direction, for example, it is advisable to arrange a wave plate such as a half-wave plate in the optical path between the light source 14 and the objective lens 10.

A part or all of the recording region 4 is made of a recording material. To intensify the plasmon resonance, it is desirable that the recording material of the recording region 4 has a metallic characteristic. Specifically, it is desirable that a sign of a real part of a dielectric constant of the recording material is negative. Further, when a real part of a relative dielectric constant of the recording material is equal to or smaller than −5, the degree of the plasmon resonance increases. Therefore, it is desirable that the real part of the relative dielectric constant of the recording material is equal to or smaller than −5. For example, taking actual metal as an example, if reproduction light is in a range of visible light, when wavelength is equal to or larger than 0.54 μm in Au, when wavelength is equal to or larger than 0.44 μm in Ag, or when wavelength is equal to or larger than 0.506 μm in Cu, the real part of the relative dielectric constant is equal to or smaller than −5 and the plasmon resonance degree is intensified in the abovementioned range. For other recording materials, a standard of a resonance degree can be determined according to a value of the real part of the relative dielectric constant.

For example, if the recording material of the recording region 4 shows the metallic characteristic in one of the recorded state and the unrecorded state and shows a nonmetallic characteristic in the other, a change in the reflectance of the recording material showing the metallic characteristic is larger than a change in the reflectance of the recording material showing the nonmetallic characteristic. In other words, a change in a reflected light amount of the recording material having smaller one of a real part of the dielectric constant of the recording material in the recorded state and a real part of the dielectric constant of the recording material in the unrecorded state is larger than a change in a reflected light amount of the recording material having larger one of the real parts. Therefore, a modulation degree of reproduction increases and satisfactory reproduction can be expected.

In other words, it is sufficient that a part or all of the recording region 4 of the recording layer 2 is made of the recording material and a sign of the real part of the dielectric constant of the recording material in the recorded state and a sign of the real part of the dielectric constant of the recording material in the unrecorded state are different from each other with respect to the wavelength of the reproduction light. Further, it is sufficient that one of the real part of the relative dielectric constant of the recording material in the recorded state and the real part of the dielectric constant of the recording material in the unrecorded state is equal to or smaller than −5 and the other is larger than −5 with respect to the wavelength of the reproduction light. In this case, the plasmon resonance degree of one of the recording material in the recorded state and the recording material in the unrecorded state is intensified. Therefore, there is an effect that the modulation degree of reproduction is further increases.

As the recording material, a phase-change recording material, an inorganic material such as bismuth oxide or titanium oxide, a photochromic material such as diarylethene, organic dye, or the like is known. Irrespective of which of the materials the recording material is, the modulation degree of reproduction can be increased if the abovementioned condition is satisfied in the wavelength of the reproduction light.

In the first embodiment, as a main component of the recording material, for example, a chalcogenide phase-change recording material of a GeTe—$Sb_2Te_3$ system such as $Ge_2Sb_2Te_5$ containing GeTe and $Sb_2Te_3$ at a ratio of 2:1 is used. The recorded state corresponds to crystal and the unrecorded state corresponds to amorphous. However, the recorded state may correspond to amorphous and the unrecorded state may correspond to crystal. The main component indicates a component of a material having a largest volume ratio included in the recording region 4. The main component having the volume ratio equal to or higher than 50% is desirable because the modulation degree of reproduction increases.

As explained above, a part or all of the recording region 4 is made of the recording material. The main component of the recording material is the phase-change recording material. Each of the recorded state and the unrecorded state corresponds to one of amorphous and crystal.

In general, the phase-change recording material has a characteristic that, when crystallizing, the phase-change recording material shows the metallic characteristic in a certain wavelength region, the region of wavelength varying depending on the composition.

For example, when the recording material is $Ge_2Sb_2Te_5$, which is a typical phase-change material, it is desirable that wavelength λ of reproduction light suitable for conversion of the light source 14 into a semiconductor laser satisfies, for example, 0.35 μm≤λ≤0.45 μm. For example, when the wavelength 2 of reproduction light of a bluish purple semiconductor laser is 0.41 μm, a real part of the relative dielectric constant of a crystalline recording material is −8.7 and a real part of the relative dielectric constant of an amorphous recording material is 0.57. This is desirable because the condition that the real part of the relative dielectric constant of the crystalline recording material is equal to or smaller than −5 and the real part of the relative dielectric constant of the amorphous recording material is larger than −5 is satisfied.

Similarly, when the wavelength λ of red reproduction light satisfying 0.6 μm≤λ≤0.7 μm suitable for the conversion of the light source 14 into a semiconductor laser is, for example, 0.65 μm, the real part of the relative dielectric constant of the crystalline recording material is −3.3 and the real part of the relative dielectric constant of the amorphous recording material is 12. Further, when the wavelength λ of infrared reproduction light satisfying 0.73 μm≤λ≤0.83 μm suitable for the conversion of the light source 14 into a semiconductor laser is, for example, 0.78 μm, the real part of the relative dielectric constant of the crystalline recording material is 5.9 and the real part of the relative dielectric constant of the amorphous recording material is 17.

Therefore, when the recording material is $Ge_2Sb_2Te_5$, at wavelength of red light to blue light (0.35 μm≤λ≤0.7 μm), signs of the real parts of the dielectric constants are different from each other in the crystalline and amorphous recording materials. Therefore, the wavelength of the red light to the blue light is desirable. In particular, at wavelength of blue light (0.35 μm≤λ≤0.45 μm), the real part of the relative dielectric constant of the crystalline recording material is equal to or smaller than −5 and the real part of the relative dielectric constant of the amorphous recording material is larger than −5. Therefore, the wavelength of the blue light is more desirable. $Ge_{22}Sb_2Te_{25}$ in which a component ratio of GeTe and $Sb_2Te_3$ is changed to 22:1 and recording materials formed at other composition ratios show the same tendency. Therefore, reproduction at the wavelength of the blue light is desirable.

When the recording material is $Ge_{31}Bi_2Te_{34}$ of a GeTe—$Bi_2Te_3$ system, the real part of the relative dielectric constant of the crystalline recording material is −9.3 and the real part of the relative dielectric constant of the amorphous recording material is 3.9 with respect to the wavelength of the blue light. The real part of the relative dielectric constant of the crystalline recording material is −2.9 and the real part of the relative dielectric constant of the amorphous recording material is 14 with respect to wavelength of the red light. The real part of the relative dielectric constant of the crystalline recording material is 15 and the real part of the relative dielectric constant of the amorphous recording material is 15 with respect to the wavelength of infrared light. As in the case of $Ge_2Sb_2Te_5$, in $Ge_{31}Bi_2Te_{34}$ as well, in the wavelength of the red light to the blue light, signs of the real parts of the dielectric constants are different from each other in the crystalline and amorphous recording materials. Therefore, the wavelength of the red light to the blue light is desirable. In particular, at the wavelength of the blue light, the real part of the relative dielectric constant of the crystalline recording material is equal to or smaller than −5 and the real part of the relative dielectric constant of the amorphous recording material is larger than −5. Therefore, it can be said that the wavelength of the blue light is more desirable. A recording material of the GeTe—$Bi_2Te_3$ system in which a component ratio is changed shows the same tendency.

Other materials, i.e., materials containing any one of $Te_{60}Ge_4Sn_{11}Au_{25}$, $Ag_4In_4Sb_{76}Te_{16}$, GeTe, (Ge—Sn)Te, (Ge—Sn)Te—$Sb_2Te_3$, (Ge—Sn)Te—$Bi_2Te_3$, GeTe—$(Sb—Bi)_2Te_3$, (Ge—Sn)Te—$(Sb—Bi)_2Te_3$, GeTe—$(Bi—In)_2Te_3$, (Ge—Sn)Te—$(Bi—In)_2Te_3$, Sb—Ga, (Sb—Te)—Ga, Sb—Ge, (Sb—Te)—Ge, Sb—In, (Sb—Te)—In, Sb—Mn—Ge, Sb—Sn—Ge, Sb—Mn—Sn—Ge, and (Sb—Te)—Ag—In have a characteristic that, when crystallizing, the phase-change recording materials show the metallic characteristic in a certain wavelength region. Therefore, it is possible to effectively use, with attention paid to a value of the real part of the relative dielectric constant, the materials containing any one of the above components in a range of the wavelength that satisfies the desirable condition.

Au is illustrated as the material of the plasmon resonance element 9. However, the material of the plasmon resonance element 9 is not limited to Au. Other materials that can plasmon-resonate with the recording material or can intensify the plasmon resonance may be selected according to the wavelength of reproduction light to be used.

In the wavelength from the red light to the infrared light, in general, irrespective of which metal the plasmon resonance element 9 is formed, the plasmon resonance is relatively easily caused simply by irradiating reproduction light. Therefore, even if the recording region 4 changes to one of the recorded state and the unrecorded state, a change in an intensification degree of the plasmon resonance with the recording material relatively less easily occurs. As a result, the modulation degree of reproduction tends to decrease.

However, the inventors have found that, when the wavelength λ of the reproduction light is the wavelength of blue that satisfies 0.35 μm≤λ≤0.45 μm, it is desirable for improving the modulation degree of reproduction that the plasmon resonance element 9 contains at least one of Au, Cu, Ti, Ni, and Ag as a main component. When the reproduction light having the wavelength of blue is simply irradiated on the materials, since the plasmon resonance degree is small, the generation of the near-field light 7 is small. However, it has been found that, when the sign of the real part of the dielectric constant of the recording region 4 is negative or when the rear part of the relative dielectric constant of the recording region 4 is equal to or smaller than −5, since the plasmon resonance element 9 and the recording region 4 interact and the degree of the plasmon resonance substantially increase, it is possible to improve the modulation degree of reproduction.

The substrate 1 of the information recording medium 3 desirably has high flatness of a surface on which the recording layer 2 is formed and high stability when the information recording medium 3 is rotated. As the material of the substrate 1, for example, a glass substrate or a metal plate of aluminum or the like is desirable. Further, resin such as polycarbonate, PMMA (polymethylmethacrylate), norbornene resin (e.g., "ARTON" (manufactured by JSR Corporation)), or cycloolefin resin (e.g., "ZEONEX" (manufactured by Zeon Corporation)) can also be used.

The recording layer 2 may have a thin film shape. The recording region 4 may have a form of a recording mark. However, in this embodiment, as shown in FIG. 2, the recording regions 4 of the recording layer 2 have thickness h and are arrayed in an island shape. The recording regions 4 include particles, a part or all of which are made of the recording material. In FIG. 2, the recording region 4a indicates the particle in the recorded state and the recording region 4b indicates the particle in the unrecorded state. An arraying period of the particles is Λx in the X-axis direction and Λy in the Y-axis direction. One particle corresponds to a conventional recording mark and has recorded information. In FIG. 2, all the particles are regularly arrayed. However, the particles do not always need to be regularly arrayed. An arraying interval or a way of arraying may be changed according to information to be recorded. It is possible to include position information and the like of the particles by variously changing the arraying interval or the way of arraying.

In the case of a thin film shape in which the recording layer 2 continuously extends, when the recording region 4 such as a recording mark is formed in the recording material, heat diffuses in the recording material and a large recording mark exceeding a recording spot is recorded. A difference in the size of the recording mark starts to be conspicuous by such heat diffusion when the recording mark is equal to smaller than 30 nm.

Therefore, the recording regions 4 of the recording layer 2 are arrayed in an island shape and formed in particle structure having size equal to or smaller than 30 nm. Consequently, since the respective particles are separated, it is possible to satisfactorily manufacture, while avoiding the influence of heat diffusion during recording, an information recording medium including the recording region 4 (the particle) equal to or smaller than 30 nm.

However, when the recording material is a particle as small as about 3 nm, the number of atoms included the particle decreases and a melting point is too low. As a result, retention of recording in the recording material becomes unstable because of thermal fluctuation. Therefore, it is desirable that the size of the recording region 4 (the particle) is equal to or larger than 3 nm.

It is desirable in terms of an increase in the density of recording to microminiaturize the particle functioning as the recording region 4 as much as possible to reduce the size of the particle and provide the particles in an isolated state close to one another as much as possible. However, when the interval of the particles is too small, it is likely that the particles come into contact with one another and independency (the isolated state) of the particles cannot be secured. Therefore, it is desirable to design the interval of the particles taking this point into account.

In this embodiment, the particle functioning as the recording region 4 indicates a particle processed in a fine convex shape shown in FIG. 2. Besides a columnar shape shown in FIG. 2, the particle may have a shape like a cone, a polygonal pyramid such as a triangular pyramid or a square pyramid, or a polygonal prism such as a triangular prism or a square prism.

Figure 4A:
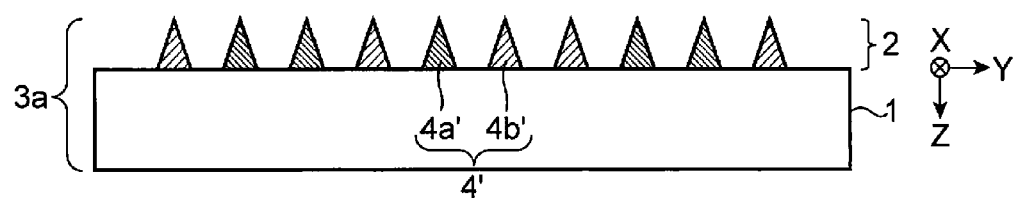
FIG. 4A is a diagram showing an example of an information recording medium including a conical recording region.

In particular, the inventors have found that, as shown in FIG. 4A, a particle having a shape pointed at an end like a cone, or a polygonal pyramid such as a triangular pyramid or a square pyramid is desirable. Moreover, as shown in FIG. 4B, a particle having a shape like a cylinder, or polygonal prism such as a triangular prism or a square prism which has a shape rounded or pointed at an end is also desirable because near-field light tends to be condensed or concentrated in a particle.

FIG. 4A is a diagram showing an example of an information recording medium including a recording region having a conical shape. FIG. 4B is a diagram showing an example of an information recording medium including a recording region having a semispherical rounded shape in a distal end portion of a cylinder.

In FIG. 4A, an information recording medium 3a includes the substrate 1 and the recording layer 2. The recording layer 2 includes a recording region 4' having a conical shape. The recording region 4' includes a recording region 4a' in the recorded state and a recording region 4b' in the unrecorded state. A distal end portion of a particle functioning as the recording region 4' has a pointed cross section. More specifically, the particle has a conical shape.

Figure 4B:
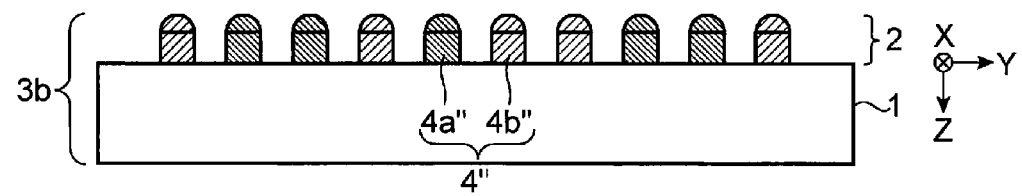
FIG. 4B is a diagram showing an example of an information recording medium including a recording region having a semispherical rounded shape in a distal end portion of a cylinder.

In FIG. 4B, an information recording medium 3b includes the substrate 1 and the recording layer 2. The recording layer 2 includes a recording region 4" having a semispherical rounded shape in a distal end portion of a cylinder. The recording region 4" includes a recording region 4a" in the recorded state and a recording region 4b" in the unrecorded state. A distal end portion of a particle functioning as the recording region 4" has an arcuate cross section. More specifically, the particle has a shape having a shape in which a hemisphere is formed in a distal end portion of a cylinder. The particle functioning as the recording region 4" may have a shape in which a cone is formed in a distal end portion of a cylinder or may be a shape in which a pyramid is formed in a distal end portion of a prism.

In the first embodiment, the reproduction light emitted from the light source 14 is irradiated on the plasmon resonance element 9 by the objective lens 10. However, the reproduction light emitted from the light source 14 may be irradiated on the plasmon resonance element 9 by, for example, an optical waveguide or an optical fiber.

An entire portion of the recording region (the particle) 4 projecting from the substrate 1 may be formed of the recording material or only a distal end portion of the portion projecting from the substrate 1 may be formed of the recording material.

The information recording medium 3 in the first embodiment explained above is an information recording medium characterized in that the information recording medium includes at least the substrate 1 and the recording layer 2, the recording regions 4 of the recording layer 2 are arrayed in an island shape, the recording regions 4 include the particles, a part or all of which are made of the recording material, and the sign of the real part of the dielectric constant of the recording material in the recorded state and the sign of the real part of the dielectric constant of the recording material in the unrecorded state are different with respect to the wavelength of the reproduction light.

The information recording medium 3 in the first embodiment is an information recording medium characterized in that the information recording medium includes at least the substrate 1 and the recording layer 2, the recording regions 4 of the recording layer 2 are arrayed in an island shape, the recording regions 4 include the particles, a part or all of which are made of the recording material, and one of the real part of the relative dielectric constant of the recording material in the recorded state and the real part of the relative dielectric constant of the recording material in the unrecorded state is equal to or smaller than −5 and the other is larger than −5 with respect to the wavelength of the reproduction light.

In the optical recording and reproduction device in the first embodiment, the plasmon resonance element 9 is made of, for example, Au. The area of the flat section is 2500 nm$^2$. The reproduction wavelength $\lambda$ is 0.405 μm. The recording region 4 is the particle made of $Ge_2Sb_2Te_5$. The diameter of the particle is 20 nm. The thickness h of the recording layer 2 is 100 nm. The space between the resonance section 22 and the recording region 4 is 15 nm. When the recording region 4 is crystalline, the reflectance is 1.00%. When the recording region 4 is amorphous, the reflectance is 1.44%. An amount of a change in the reflectance is 0.44% and a modulation degree of reproduction is 31%. The satisfactory values are respectively obtained. The modulation degree of reproduction can be calculated by dividing the amount of the change in the reflectance by the larger reflectance of the reflectance of the crystalline recording region 4 and the reflectance of the amorphous recording region 4 (=0.44/1.44).

Since the size of the plasmon resonance element 9 is not subjected to a spatial limitation, it is possible to form the plasmon resonance element 9 larger than the recording region such as the recording mark. The optical recording and reproduction device according to the first embodiment directly irradiates the reproduction light on the plasmon resonance element 9 rather than near-field light and detects reflected light from the plasmon resonance element 9. Therefore, it is possible to set a reflected light amount or a light amount change sufficiently large.

Second Embodiment

Figure 5:
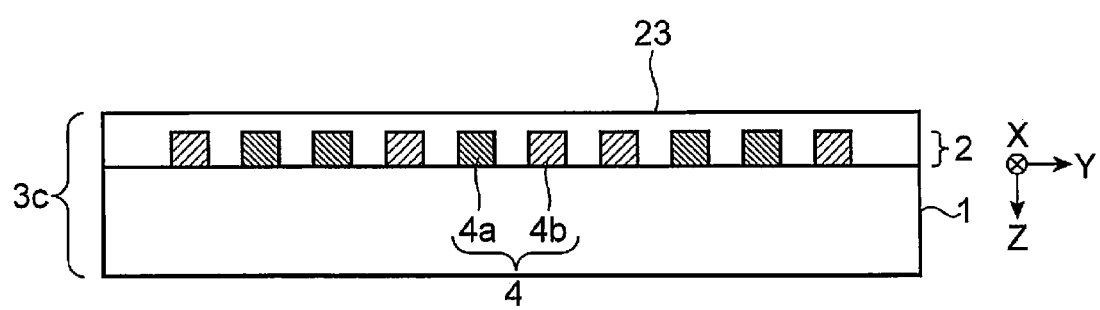
FIG. 5 is a sectional view showing the configuration of an information recording medium in a second embodiment of the present invention.

An information recording medium in a second embodiment of the present invention is explained next. FIG. 5 is a sectional view showing the configuration of an information recording medium 3c in the second embodiment of the present invention. The information recording medium 3c is different from the information recording medium 3 in the first embodiment in that a protective layer 23, of which dielectric constant has a real part with a positive sign, is formed in an upper layer of the recording region 4 of the recording layer 2 formed on the substrate 1. In other words, the information recording medium 3c further includes, in the upper layer of the recording region 4, the protective layer 23 of which dielectric constant has a real part with a positive sign and which is used for protecting the recording region 4. Since the protective layer 23 is provided, it is possible to improve resistance to environment of the particle functioning as the recording region 4 formed of the recording material. It is possible to reduce damage to the recording region 4 due to contact of the distal end of the plasmon resonance element 9 with the resonance section 22. Further, since the sign of the real part of the dielectric constant of the protective layer 23 is positive, it is possible to prevent unnecessary plasmon resonance from occurring between the protective layer 23 and the resonance section 22. As a result, it is possible to prevent deterioration in the modulation degree of reproduction due to an adverse effect from the protective layer 23.

As the protective layer 23 of which dielectric constant has a real part with a positive sign, inorganic materials such as one or a plurality of oxides selected out of, for example, $ZrSiO_4$, $(ZrO_2)_{25}(SiO_2)_{25}(Cr_2O_3)_{50}$, SiCr, $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$ can be used.

As the protective layer 23, one or a plurality of nitrides selected out of C—N, Ti—N, Zr—N, Nb—N, Ta—N, Si—N, Ge—N, Cr—N, Al—N, Ge—Si—N, Ge—Cr—N, and the like can also be used. Further, as the protective layer 23, a sulfide such as ZnS, a carbonate such as SiC, or a fluoride such as $LaF_3$, $CeF_3$, or $MgF_2$ can also be used. The protective layer 23 may be formed using a mixture of one or a plurality of materials selected out of the abovementioned materials. Further, the protective layer 23 may be formed of an organic material such as resin. In this case, it is possible to further reduce impact during collision than impact in the case of the inorganic material. The protective layer 23 may be formed of a mixed material of the organic material and the inorganic material.

The surface of the protective layer 23 is formed optically flat, whereby unevenness of the surface is eliminated. Therefore, it is possible to reduce contact with the plasmon resonance element 9 due to the unevenness of the surface.

Third Embodiment

An optical information reproduction device in a third embodiment of the present invention is explained centering on differences from the optical information reproduction device in the first embodiment with reference to FIGS. 6, 7, 8A, and 8B.

Figure 6:
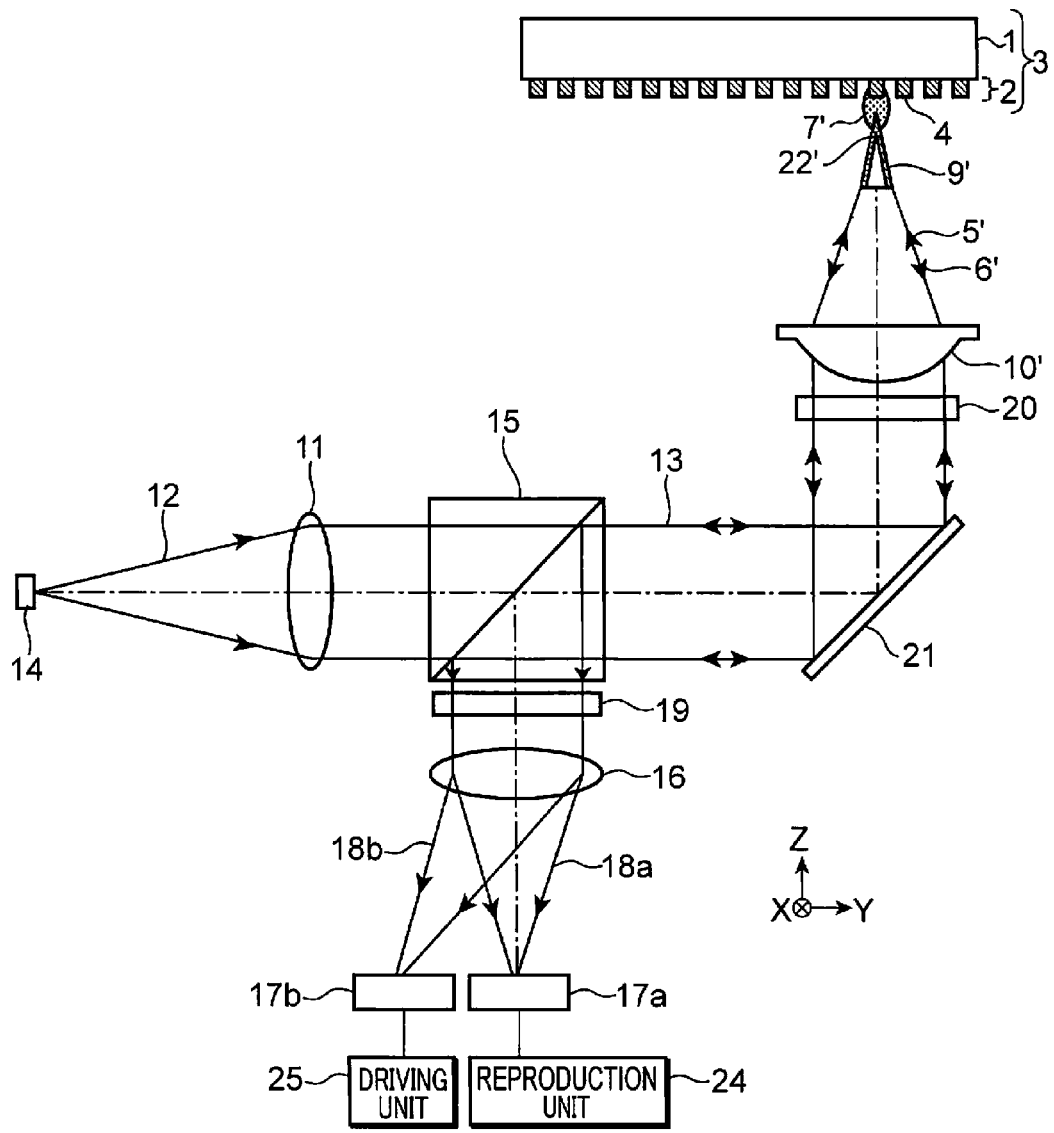
FIG. 6 is a diagram showing the configuration of an optical information reproduction device in a third embodiment of the present invention.
Figure 7:
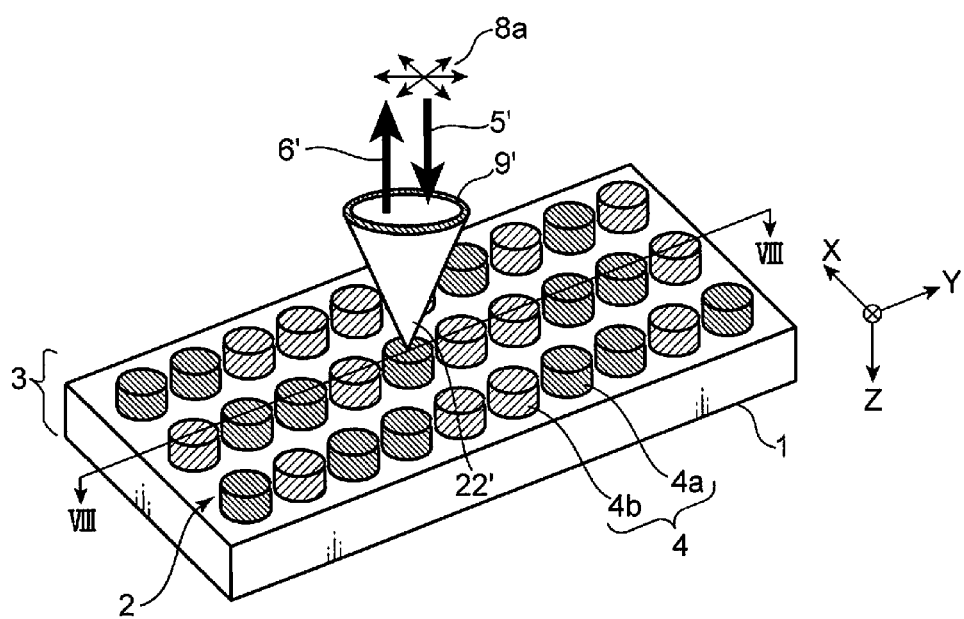
FIG. 7 is an explanatory diagram showing a plasmon resonance element of the optical information reproduction device in the third embodiment of the present invention and a state in which information is reproduced from an information recording medium.
Figure 8A:
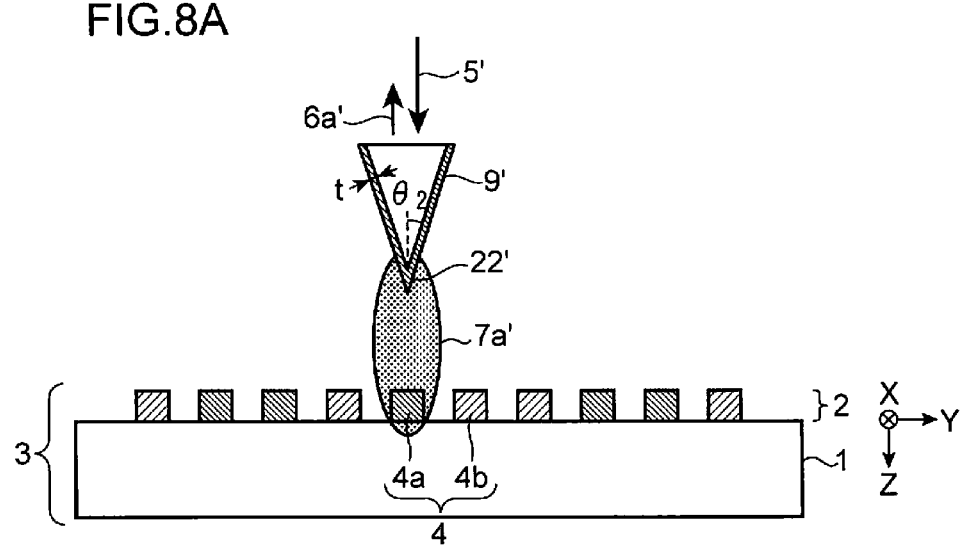
FIG. 8A is a sectional view taken along line VIII-VIII in FIG. 7 showing a state of the vicinity of the plasmon resonance element in the case in which, in the third embodiment of the present invention, a recording region of the information recording medium is in a recorded state and a plasmon resonance degree is large.
Figure 8B:
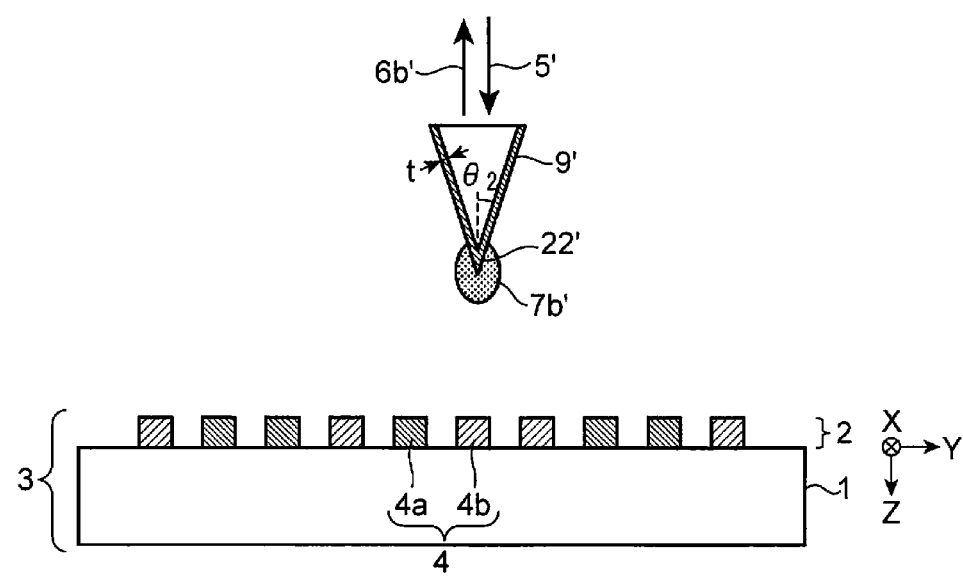
FIG. 8B is a sectional view taken along line VIII-VIII in FIG. 7 showing a state of the vicinity of the plasmon resonance element in the case in which, in the third embodiment of the present invention, the recording region of the information recording medium is in an unrecorded state and the plasmon resonance degree is small.

FIG. 6 is a diagram showing the configuration of the optical information reproduction device in the third embodiment of the present invention. FIG. 7 is an explanatory diagram showing a plasmon resonance element of the optical information reproduction device in the third embodiment of the present invention and a state in which information is reproduced from an information recording medium. FIG. 8A is a sectional view taken along line VIII-VIII in FIG. 7 showing a state of the vicinity of the plasmon resonance element in the case in which, in the third embodiment of the present invention, a recording region of the information recording medium is in a recorded state and a plasmon resonance degree is large. FIG. 8B is a sectional view taken along line VIII-VIII in FIG. 7 showing a state of the vicinity of the plasmon resonance element in the case in which, in the third embodiment of the present invention, the recording region of the information recording medium is in an unrecorded state and the plasmon resonance degree is small.

The optical information reproduction device in the third embodiment is different from the optical information reproduction device in the first embodiment in the shape of a plasmon resonance element 9' and the shape of an objective lens 10'. Further, the optical information reproduction device in the third embodiment includes a radially-polarized light generating element 20 and a mirror 21 in an optical path between the beam splitter 15 and the objective lens 10' in an optical path between the light source 14 and the plasmon resonance element 9'.

The plasmon resonance element 9' is a conical prism in which the surface other than the bottom surface is coated with a metal film. The conical prism includes a resonance section 22' in the vicinity of the vertex. The objective lens 10' is a normal inline lens in which the optical axis of incident light and the optical axis of emitted light coincide with each other.

The radially-polarized light generating element 20 is arranged in the optical path between the light source 14 and the plasmon resonance element 9'. Since the radially-polarized light generating element 20 is arranged, the radially-polarized light can be included in irradiation light 5' condensed in the plasmon resonance element 9' by the objective lens 10'. When the irradiation light 5' including the radially-polarized light is made incident on the bottom surface of the conical prism functioning as the plasmon resonance element 9', propagating surface plasmon propagates to an interface between the metal film coated on the side surface and the conical prism. Near-field light 7', a polarization direction of which is the Z direction, is generated in the resonance section 22' at the distal end.

Therefore, an intensification degree of plasmon resonance between the resonance section 22' and the recording region 4 changes according to whether the recording region 4 is in the recorded state or the unrecorded state. Therefore, by detecting reflected light 6' from the plasmon resonance element 9', as in the optical information reproduction device in the first embodiment, it is possible to determine whether the recording region 4 is in the recorded state or the unrecorded state, and reproduction information recorded in the recording region 4.

FIGS. 8A and 8B are examples in which a degree of plasmon resonance is larger in the recording region 4a in the recorded state than in the recording region 4b in the unrecorded state. FIG. 8A shows a case in which the resonance section 22' of the plasmon resonance element 9' is present on the recording region 4a in the recorded state. In FIG. 8A, the near-field light 7a' is generated between the resonance section 22' and the recording region 4a and the plasmon resonance degree increases. As a result, a light amount of the reflected light 6a' changes (in FIG. 8A, decreases). FIG. 8B shows a case in which the resonance section 22' of the plasmon resonance element 9' is present on the recording region 4b in the unrecorded state. In FIG. 8B, the near-field light 7b' is generated only in the vicinity of the resonance section 22' and the plasmon resonance degree decreases. As a result, the light amount of the reflected light 6b' hardly changes.

Therefore, in the optical information reproduction device in the third embodiment, since the normal inline objective lens 10' is used, it is possible to use an optical system that condenses light perpendicularly to the substrate 1 of the information recording medium 3 or the formation surface (the XY plane) of the recording layer 2. Therefore, a degree of freedom of design increases and it is easy to arrange the optical system. Further, it is also easy to increase an NA of the objective lens 10'. As a result, it is possible to increase the intensity of the near-field light 7' generated from the resonance section 22'.

As shown in FIGS. 8A and 8B, a vertical angle of the plasmon resonance element 9' is $2\theta_2$. A metal film of, for example, Au or Al is coated on a conical prism made of, for example, glass or plastic. The shape of the plasmon resonance element 9' is set to so-called Kretschmann arrangement, whereby it is possible to efficiently change the irradiation light 5' of radially-polarized light into surface plasmon. For example, when the reproduction wavelength $\lambda$ is 0.405 μm, it is desirable that an angle $\theta_2$ is 43.4° and Al having thickness t of 16.3 nm is coated on a prism. At this point, the irradiation light 5' of nearly 100% can be changed to propagating surface plasmon.

For example, when the vertical angle of $2\theta_2$ is as small as to 8°, a mode called super focusing can be present. It is known that, at this point, the wavelength of the propagating surface plasmon decreases as the propagating surface plasmon propagates in the direction of the resonance section 22' at the distal end. It is possible to perform plasmon resonance with the finer recording region 4 and intensification of the plasmon resonance. Therefore, a modulation degree of reproduction with respect to the finer recording region 4 is satisfactory. This is desirable in terms of reproduction of a high-density information recording medium.

Fourth Embodiment

Figure 9:
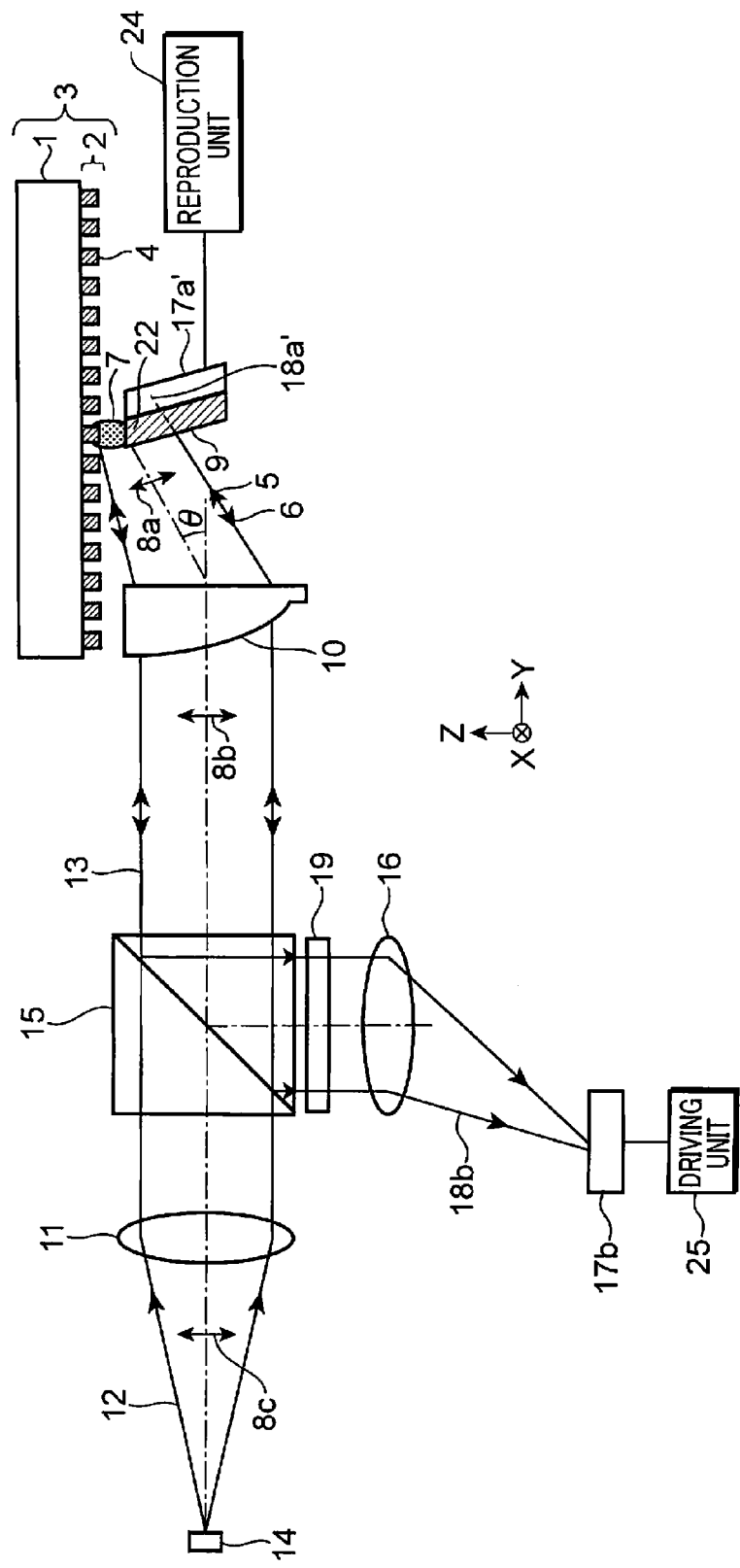
FIG. 9 is a diagram showing the configuration of an optical information reproduction device in a fourth embodiment of the present invention.
Figure 10:
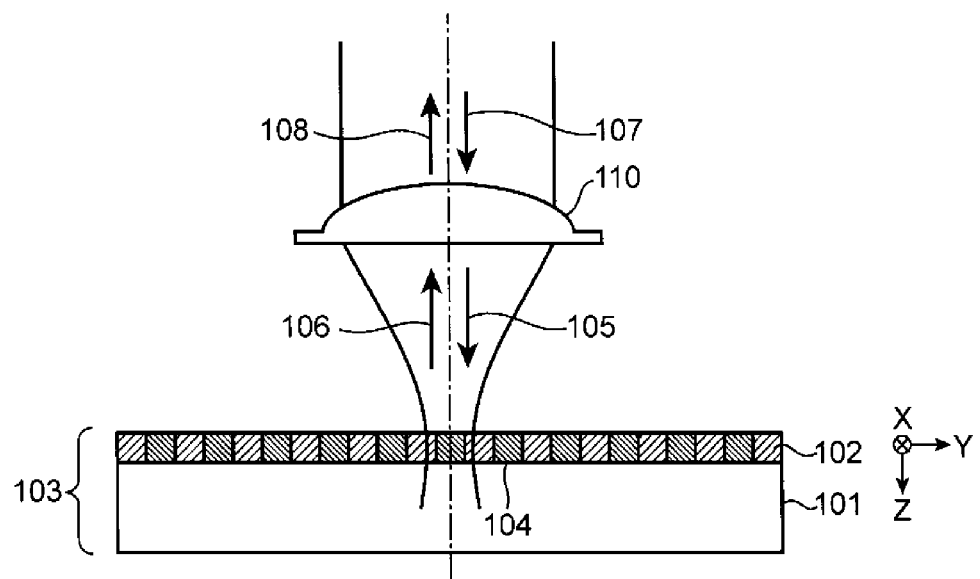
FIG. 10 is an explanatory diagram showing a part of the configuration of a conventional optical information recording and reproduction device and a state in which information is reproduced from an information recording medium.

An optical information reproduction device in a fourth embodiment of the present invention is explained centering on differences from the optical information reproduction device in the first embodiment with reference to FIG. 9.

FIG. 9 is a diagram showing the configuration of the optical information reproduction device in the fourth embodiment of the present invention. In the optical information reproduction device in the first embodiment, reflected light from the plasmon resonance element 9 is detected. However, in the optical information reproduction device in the fourth embodiment, transmitted light from the plasmon resonance element 9 is detected.

The optical information reproduction device in the fourth embodiment includes the plasmon resonance element 9, the objective lens 10, the collimator lens 11, the light source 14, the beam splitter 15, the detection lens 16, photodetectors 17a' and 17b, the optical element for servo signal detection 19, the reproduction unit 24, and the driving unit 25.

The photodetector 17a' is arranged in contact with a surface opposed to the surface on the light incident side of the plasmon resonance element 9. The photodetector 17a' detects transmitted light 18a' from the plasmon resonance element 9 on which reproduction light is irradiated. The reproduction unit 24 determines on the basis of a detection signal from the photodetector 17a' whether the recording region 4 is in the recorded state or the unrecorded state, and reproduces information recorded in the recording region 4.

A transmitted light amount changes according to a degree of plasmon resonance between the resonance section 22 of the plasmon resonance element 9 and the recording region 4 in the recorded state or the recording region 4 in the unrecorded state. For example, the change in the transmitted light amount is larger when the degree of the plasmon resonance between the resonance section 22 of the plasmon resonance element 9 and the recording region 4a in the recorded state or the recording region 4b in the unrecorded state is larger.

It is considered that, when the plasmon resonance between the plasmon resonance element 9 and the recording region 4 is intensified, a dielectric loss (absorption) increases in the plasmon resonance element 9. In general, the transmitted light amount from the plasmon resonance element 9 decreases.

As explained above, the transmitted light 18a' is detected by the photodetector 17a' and it is determined on the basis of the detection signal from the photodetector 17a' whether the recording region 4 is in the recorded state or the unrecorded state. Consequently, it is possible to reproduce the information recorded in the recording region 4.

The configuration of the fourth embodiment is the same as the configuration of the first embodiment except that the information recorded in the recording region 4 is reproduced by detecting the transmitted light 18a'. Therefore, detailed explanation of the configuration of the fourth embodiment is omitted.

The optical recording and reproduction device in the fourth embodiment directly irradiate reproduction light on the plasmon resonance element 9 rather than near-field light and detects transmitted light from the plasmon resonance element 9. Therefore, it is possible to set a transmitted light amount or a light amount change sufficiently large.

In the fourth embodiment, the photodetector 17a' is arranged in contact with the surface opposed to the surface on the light incident side of the plasmon resonance element 9. However, the present invention is not limited to this arrangement. The photodetector 17a' may be provided in a position away from the plasmon resonance element 9. A lens for guiding light transmitted through the plasmon resonance element 9 to the photodetector 17a' may be provided between the plasmon resonance element 9 and the photodetector 17a'.

The optical information reproduction devices, the optical information reproduction methods, and the information recording media in the first to fourth embodiments are explained above. However, the present invention is not limited to the embodiments. An optical information reproduction device, an optical information reproduction method, and an information recording medium respectively obtained by combining the configurations of the optical information reproduction methods, and the information recording media in the first to fourth embodiments are also included in the present invention. Effects same as the effects in the first to fourth embodiments can be realized.

The objective lens, the collimator lens, and the detection lens used in the first to fourth embodiments are named only for convenience and are the same as a general lens.

In the first to fourth embodiments, an optical disk is explained as an example of the information recording medium. However, application to a card-like, drum-like, or tape-like product designed to be capable of reproducing, with the optical information reproduction devices in the first to fourth embodiment, a plurality of media with different specifications such as thickness and recording density is also included in the scope of the present invention.

Inventions having configurations explained below are mainly included in the specific embodiments explained above.

An optical information reproduction device according to an aspect of the present invention is an optical information reproduction device that reproduces information recorded on an information recording medium including at least a substrate and a recording layer, the optical information reproduction device including: a light source configured to emit reproduction light; a plasmon resonance element including a resonance section arranged adjacent to a recording region of the recording layer, the resonance section causing plasmon resonance between the recording region and the resonance section; a photodetector configured to detect reflected light or transmitted light from the plasmon resonance element on which the reproduction light is irradiated; and a reproduction unit configured to determine, on the basis of a detection signal from the photodetector, whether the recording region is in a recorded state or an unrecorded state, and reproduction information recorded in the recording region.

With this configuration, the reproduction light emitted from the light source is irradiated on the plasmon resonance element, the reflected light or the transmitted light from the plasmon resonance element is detected, it is determined on the basis of the detection signal whether the recording region is in the recorded state or the unrecorded state, and the information recorded in the recording region is reproduced.

Therefore, even if the size of the recording region is smaller than a diffraction limit of light, it is possible to satisfactorily reproduce the information by making use of the fact that a plasmon resonance degree between the recording region and the resonance section of the plasmon resonance element changes according to a state of the recording region, whereby a reflected light amount or a transmitted light amount from the plasmon resonance element changes.

Since the size of the plasmon resonance element is not subjected to a spatial limitation, it is possible to form the plasmon resonance element larger than the recording region. Further, the reflected light or the transmitted light from the plasmon resonance element is detected by directly irradiating the reproduction light on the plasmon resonance element rather than near-field light. Therefore, it is possible to set the reflected light amount, the transmitted light amount, a light amount change of the reflected light amount, or a light amount change of the transmitted light amount sufficiently large. It is possible to improve a modulation degree of a reproduction signal.

In the optical information reproduction device, it is desirable that the reproduction light is irradiated also on the recording region adjacent to the resonance section.

With this configuration, the reproduction light is irradiated on the recording region 4 adjacent to the resonance section of the plasmon resonance element as well. Therefore, the plasmon resonance is further intensified, a difference between the reflected light amount or the transmitted light amount between the recorded state and the unrecorded state increases, and detection sensitivity is improved.

In the optical information reproduction device, it is desirable that a reflected light amount or a transmitted light amount from the plasmon resonance element changes according to the degree of the plasmon resonance between the resonance section of the plasmon resonance element and the recording region in the recorded state or the recording region in the unrecorded state.

With this configuration, the reflected light amount or the transmitted light amount from the plasmon resonance element changes according to a degree of the plasmon resonance between the resonance section of the plasmon resonance element and the recording region in the recorded state or the recording region in the unrecorded state. Therefore, by detecting the reflected light or the transmitted light from the plasmon resonance element, it is possible to determine whether the recording region is in the recorded state or the unrecorded state.

In the optical information reproduction device, it is desirable that a part or all of the recording region is made of a recording material, and a sign of a real part of the dielectric constant of the recording material in the recorded state and a sign of a real part of the dielectric constant of the recording material in the unrecorded state are different from each other with respect to the wavelength of the reproduction light.

With this configuration, the sign of the real part of the dielectric constant of the recording material in the recorded state and the sign of the real part of the dielectric constant of the recording material in the unrecorded state are different from each other with respect to the wavelength of the reproduction light. Therefore, a plasmon resonance degree of one of the recording material in the recorded state and the recording material in the unrecorded state is intensified. It is possible to further improve the modulation degree of reproduction.

In the optical information reproduction device, it is desirable that a part or all of the recording region is made of a recording material, and one of a real part of the relative dielectric constant of the recording material in the recorded state and a real part of the relative dielectric constant of the recording material in the unrecorded state is equal to or smaller than −5 and the other is larger than −5 with respect to the wavelength of the reproduction light.

With this configuration, one of the real part of the relative dielectric constant of the recording material in the recorded state and the real part of the relative dielectric constant of the recording material in the unrecorded state is equal to or smaller than −5 and the other is larger than −5 with respect to the wavelength of the reproduction light. Therefore, the plasmon resonance degree of one of the recording material in the recorded state and the recording material in the unrecorded state is further intensified. It is possible to further improve the modulation degree of reproduction.

In the optical information reproduction device, it is desirable that a change in a reflected light amount or a transmitted light amount of the recording material with a smaller real part of the dielectric constant among the real part of the dielectric constant of the recording material in the recorded state and the real part of the dielectric constant of the recorded material in the unrecorded state, is larger than a change in a reflected light amount or a transmitted light amount of the recording material with the larger real part of the dielectric constant.

With this configuration, the change in the reflected light amount or the transmitted light amount of the recording material with a smaller real part of the dielectric constant among the real part of the dielectric constant of the recording material in the recorded state and the real part of the dielectric constant of the recorded material in the unrecorded state, is larger than the change in the reflected light amount or the transmitted light amount of the recording material with the larger real part of the dielectric constant. Therefore, the modulation degree of reproduction increases and it is possible to satisfactorily reproduce the information.

In the optical information reproduction device, it is desirable that a part or all of the recording region is made of a recording material, a main component of the recording material is a phase-change recording material, and the recorded state and the unrecorded state respectively correspond to one of amorphous and crystal.

With this configuration, dielectric constants of the crystalline recording material and the amorphous recording material are different from each other. Therefore, the plasmon resonance degree of one of the recording material in the recorded state and the recording material in the unrecorded state is intensified. It is possible to improve the modulation degree of reproduction.

In the optical information reproduction device, it is desirable that wavelength λ of the reproduction light satisfies 0.35 μm≤λ≤0.45 μm.

With this configuration, it is possible to apply the optical information reproduction device to the reproduction light, the wavelength λ of which satisfies 0.35 μm≤λ≤0.45 μm.

In the optical information reproduction device, it is desirable that the plasmon resonance element includes a flat section arranged substantially perpendicularly to an optical axis of the reproduction light, and the reproduction light is irradiated on the flat section.

With this configuration, it is possible to reflect the reproduction light, which is irradiated on the flat section of the plasmon resonance element, as reflected light at substantially the same angle and in the opposite direction. It is possible to increase efficiency of light utilization.

In the optical information reproduction device, it is desirable that the light source has a characteristic that, on an optical axis of the reproduction light irradiated on the plasmon resonance element, the amplitude of a polarization component of the reproduction light polarizing in a perpendicular direction with respect to an arrangement surface of the recording layer is larger than the amplitude of a polarization component of the reproduction light polarizing in other polarization directions.

With this configuration, on the optical axis of the reproduction light irradiated on the plasmon resonance element, the amplitude of the polarization component of the reproduction light polarizing in the perpendicular direction with respect to the arrangement surface of the recording layer is set larger than the amplitude of the polarization component of the reproduction light polarizing in other polarization directions. Therefore, it is possible to cause the resonance section of the plasmon resonance element to interact with the recording region and cause plasmon resonance of the resonance section of the plasmon resonance element.

In the optical information reproduction device, it is desirable that the optical information reproduction device further includes a polarization control optical element configured to convert a polarization state of the reproduction light emitted from the light source, and the polarization control optical element sets the amplitude of a polarization component of the reproduction light polarizing in a perpendicular direction with respect to an arrangement surface of the recording layer larger than the amplitude of a polarization component of the reproduction light polarizing in other polarization directions.

With this configuration, the amplitude of the polarization component of the reproduction light polarizing in the perpendicular direction with respect to the arrangement surface of the recording layer is set larger than the amplitude of the polarization component of the reproduction light polarizing in other polarization directions. Therefore, it is possible to cause the resonance section of the plasmon resonance element to interact with the recording region and cause plasmon resonance of the resonance section of the plasmon resonance element.

In the optical information reproduction device, it is desirable that the polarization control optical element includes a wave plate. With this configuration, it is possible to easily change a polarization direction with the wave plate.

In the optical information reproduction device, it is desirable that the optical information reproduction device further includes an off-axis condensing lens configured to irradiate the reproduction light on the plasmon resonance element.

With this configuration, the off-axis condensing lens is used. Therefore, it is possible to prevent contact of the condensing lens and the information recording medium and condense the reproduction light in the vicinity of the resonance section of the plasmon resonance element from an oblique lateral direction.

In the optical information reproduction device, it is desirable that the optical information reproduction device further includes a radially-polarized light generating element arranged in an optical path between the light source and the plasmon resonance element and configured to include radially-polarized light in the reproduction light condensed in the plasmon resonance element. With this configuration, it is possible to irradiate the reproduction light including the radially-polarized light on the plasmon resonance element.

In the optical information reproduction device, it is desirable that the plasmon resonance element is a conical prism in which a surface other than a bottom surface is coated with a metal film, and the conical prism includes the resonance section in the vicinity of the vertex.

With this configuration, when the reproduction light including the radially-polarized light is made incident on the bottom surface of the conical prism functioning as the plasmon resonance element, propagating surface plasmon propagates to an interface between the metal film coated on the surface other than the bottom surface and the conical prism and near-field light is generated in the resonance section in the vicinity of the vertex of the conical prism.

Therefore, an intensity degree of plasmon resonance between the resonance section and the recording region changes according to whether the recording region is in the recorded state or the unrecorded state. Therefore, it is possible to determine, by detecting reflected light from the plasmon resonance element, whether the recording region is in the recorded state or the unrecorded state and satisfactorily reproduce the information recorded in the recording region.

In the optical information reproduction device, it is desirable that wavelength $\lambda$ of the reproduction light satisfies 0.35 $\mu m \leq \lambda \leq 0.45$ $\mu m$, and a main component of the plasmon resonance element is at least one of Au, Cu, Ti, Ni, and Ag.

With this configuration, when at least one of Au, Cu, Ti, Ni, and Ag is used as the main component of the plasmon resonance element and the sign of the real part of the dielectric constant of the recording region is negative or the real part of the relative dielectric constant of the recording region is equal to or smaller than $-5$, the degree of the plasmon resonance substantially increases. Therefore, it is possible to improve the modulation degree of reproduction.

An optical information reproduction method according to another aspect of the present invention is an optical information reproduction method for reproducing information from an information recording medium including at least a substrate and a recording layer, the optical information reproduction method including: a step of irradiating reproduction light emitted from a light source on a plasmon resonance element including a resonance section arranged adjacent to a recording region of the recording layer, the resonance section causing plasmon resonance between the recording region and the resonance section; a step of detecting, with a photodetector, reflected light or transmitted light from the plasmon resonance element on which the reproduction light is irradiated; and a step of determining, on the basis of a detection signal from the photodetector, whether the recording region is in a recorded state or an unrecorded state, and reproducing information recorded in the recording region.

With this configuration, the reproduction light emitted from the light source is irradiated on the plasmon resonance element, the reflected light or the transmitted light from the plasmon resonance element is detected, it is determined on the basis of the detection signal whether the recording region is in the recorded state or the unrecorded state, and the information recorded in the recording region is reproduced.

Therefore, even if the size of the recording region is smaller than a diffraction limit of light, it is possible to satisfactorily reproduce the information by making use of the fact that a plasmon resonance degree between the recording region and the resonance section of the plasmon resonance element changes according to a state of the recording region, whereby a reflected light amount or a transmitted light amount from the plasmon resonance element changes.

Since the size of the plasmon resonance element is not subjected to a spatial limitation, it is possible to form the plasmon resonance element larger than the recording region. Further, the reflected light or the transmitted light from the plasmon resonance element is detected by directly irradiating the reproduction light on the plasmon resonance element rather than near-field light. Therefore, it is possible to set the reflected light amount, the transmitted light amount, a light amount change of the reflected light amount, or a light amount change of the transmitted light amount sufficiently large. It is possible to improve a modulation degree of a reproduction signal.

An information recording medium according to still another aspect of the present invention includes at least a substrate and a recording layer. A recording region of the recording layer is arrayed in an island shape, the recording region includes a particle, a part or all of which is made of a recording material, and a sign of a real part of the dielectric constant of the recording material in a recorded state and a sign of a real part of the dielectric constant of the recording material in an unrecorded state are different from each other with respect to the wavelength of the reproduction light.

With this configuration, the sign of the real part of the dielectric constant of the recording material in the recorded state and the sign of the real part of the dielectric constant of the recording material in the unrecorded state are different from each other with respect to the wavelength of the reproduction light. Therefore, a plasmon resonance degree of one of the recording material in the recorded state and the recording material in the unrecorded state is intensified. It is possible to further improve the modulation degree of reproduction and satisfactorily reproduce the information.

An information recording medium according to still another aspect of the present invention includes at least a substrate and a recording layer. A recording region of the recording layer is arrayed in an island shape, the recording region includes a particle, a part or all of which is made of a recording material, and one of a real part of the relative dielectric constant of the recording material in a recorded state and a real part of the relative dielectric constant of the recording material in an unrecorded state is equal to or smaller than −5 and the other is larger than −5 with respect to the wavelength of the reproduction light.

With this configuration, one of the real part of the relative dielectric constant of the recording material in the recorded state and the real part of the relative dielectric constant of the recording material in the unrecorded state is equal to or smaller than −5 and the other is larger than −5 with respect to the wavelength of the reproduction light. Therefore, the plasmon resonance degree of one of the recording material in the recorded state and the recording material in the unrecorded state is further intensified. It is possible to further improve the modulation degree of reproduction and satisfactorily reproduce the information.

In the information recording medium, it is desirable that a distal end portion of the particle includes a pointed cross section or an arcuate cross section.

With this configuration, the distal end portion of the particle includes the pointed cross section or the arcuate cross section. Therefore, near-field light is condensed or concentrated on the particle. It is possible to intensify the plasmon resonance degree.

In the information recording medium, it is desirable that the information recording medium further includes, in an upper layer of the recording region, a protective layer of which dielectric constant has a real part with a positive sign.

With this configuration, the protective layer, of which dielectric constant has a real part with a positive sign, is arranged in the upper layer of the recording region. Therefore, it is possible to improve resistance to environment of the particle functioning as the recording region formed of the recording material and reduce damage to the recording region due to contact of the distal end of the plasmon resonance element with the resonance section.

The specific embodiments and the examples described in the section of Description of Embodiments are solely clarifying the technical contents of the present invention. The present invention should not be limited to such specific examples and interpreted narrowly. The present invention can be variously modified and carried out within the scope of the spirit of the present invention and claimed elements.

INDUSTRIAL APPLICABILITY

With an optical information reproduction device, an optical information reproduction method, and an information recording medium according to the present invention, it is possible to satisfactorily reproduce information even if the size of a recording region such as a recording mark in which the information is recorded is smaller than a diffraction limit of light. The optical information reproduction device, the optical information reproduction method, and the information recording medium according to the present invention are useful for an optical information reproduction device and an optical information reproduction method for optically reproducing information recorded in an information recording medium and useful for an information recording medium including at least a substrate and a recording layer.

The invention claimed is:

1. An optical information reproduction device that reproduces information recorded on an information recording medium including at least a substrate and a recording layer, the optical information reproduction device comprising:
    a light source configured to emit reproduction light;
    a plasmon resonance element including a resonance section arranged adjacent to a recording region of the recording layer, the resonance section causing plasmon resonance between the recording region and the resonance section;
    a photodetector configured to detect reflected light or transmitted light from the plasmon resonance element on which the reproduction light is irradiated; and
    a reproduction unit configured to determine, on the basis of a detection signal from the photodetector, whether the recording region is in a recorded state or an unrecorded state, and reproduce information recorded in the recording region.

2. The optical information reproduction device according to claim 1, wherein the reproduction light is irradiated also on the recording region adjacent to the resonance section.

3. The optical information reproduction device according to claim 1, wherein
    a reflected light amount or a transmitted light amount from the plasmon resonance element changes according to the degree of the plasmon resonance between the resonance section of the plasmon resonance element and the recording region in the recorded state or the recording region in the unrecorded state.

4. The optical information reproduction device according to claim 1, wherein
    a part or all of the recording region is made of a recording material, and
    a sign of a real part of dielectric constant of the recording material in the recorded state and a sign of a real part of dielectric constant of the recording material in the unrecorded state are different from each other with respect to wavelength of the reproduction light.

5. The optical information reproduction device according to claim 1, wherein
a part or all of the recording region is made of a recording material, and
one of a real part of relative dielectric constant of the recording material in the recorded state and a real part of relative dielectric constant of the recording material in the unrecorded state is equal to or smaller than −5 and the other is larger than −5 with respect to wavelength of the reproduction light.

6. The optical information reproduction device according to claim 4, wherein a change in a reflected light amount or a transmitted light amount of the recording material with a smaller real part of the dielectric constant among the real part of the dielectric constant of the recording material in the recorded state and the real part of the dielectric constant of the recorded material in the unrecorded state, is larger than a change in a reflected light amount or a transmitted light amount of the recording material with the larger real part of the dielectric constant.

7. The optical information reproduction device according to claim 1, wherein
a part or all of the recording region is made of a recording material,
a main component of the recording material is a phase-change recording material, and
the recorded state and the unrecorded state respectively correspond to one of amorphous and crystal.

8. The optical information reproduction device according to claim 1, wherein wavelength $\lambda$ of the reproduction light satisfies 0.35 $\mu m \leq \lambda \leq 0.45$ $\mu m$.

9. The optical information reproduction device according to claim 1, wherein
the plasmon resonance element includes a flat section arranged substantially perpendicularly to an optical axis of the reproduction light, and
the reproduction light is irradiated on the flat section.

10. The optical information reproduction device according to claim 1, wherein the light source has a characteristic that, on an optical axis of the reproduction light irradiated on the plasmon resonance element, amplitude of a polarization component of the reproduction light polarizing in a perpendicular direction with respect to an arrangement surface of the recording layer is larger than amplitude of a polarization component of the reproduction light polarizing in other polarization directions.

11. The optical information reproduction device according to claim 1, further comprising a polarization control optical element configured to convert a polarization state of the reproduction light emitted from the light source, wherein
the polarization control optical element sets amplitude of a polarization component of the reproduction light polarizing in a perpendicular direction with respect to an arrangement surface of the recording layer larger than amplitude of a polarization component of the reproduction light polarizing in other polarization directions.

12. The optical information reproduction device according to claim 11, wherein the polarization control optical element includes a wave plate.

13. The optical information reproduction device according to claim 1, further comprising an off-axis condensing lens configured to irradiate the reproduction light on the plasmon resonance element.

14. The optical information reproduction device according to claim 1, further comprising a radially-polarized light generating element arranged in an optical path between the light source and the plasmon resonance element and configured to include radially-polarized light in the reproduction light condensed in the plasmon resonance element.

15. The optical information reproduction device according to claim 14, wherein
the plasmon resonance element is a conical prism in which a surface other than a bottom surface is coated with a metal film, and
the conical prism includes the resonance section in a vicinity of a vertex.

16. The optical information reproduction device according to claim 1, wherein
wavelength $\lambda$ of the reproduction light satisfies 0.35 $\mu m \leq \lambda \leq 0.45$ $\mu m$, and
a main component of the plasmon resonance element is at least one of Au, Cu, Ti, Ni, and Ag.

17. An optical information reproduction method for reproducing information from an information recording medium including at least a substrate and a recording layer, the optical information reproduction method comprising:
a step of irradiating reproduction light emitted from a light source on a plasmon resonance element including a resonance section arranged adjacent to a recording region of the recording layer, the resonance section causing plasmon resonance between the recording region and the resonance section;
a step of detecting, with a photodetector, reflected light or transmitted light from the plasmon resonance element on which the reproduction light is irradiated; and
a step of determining, on the basis of a detection signal from the photodetector, whether the recording region is in a recorded state or an unrecorded state, and reproducing information recorded in the recording region.

18. The optical information reproduction device according to claim 1, wherein:
the information recording medium comprises at least a substrate and a recording layer,
a recording region of the recording layer is arrayed in an island shape,
the recording region includes a particle, a part or all of which is made of a recording material and which changes to a recorded state or an unrecorded state using plasmon resonance, and
a sign of a real part of dielectric constant of the recording material in a recorded state and a sign of a real part of dielectric constant of the recording material in an unrecorded state are different from each other with respect to wavelength of the reproduction light.

19. The optical information reproduction device according to claim 1, wherein:
the information recording medium comprises at least a substrate and a recording layer,
a recording region of the recording layer is arrayed in an island shape,
the recording region includes a particle, a part or all of which is made of a recording material and which changes to a recorded state or an unrecorded state using plasmon resonance, and
one of a real part of relative dielectric constant of the recording material in a recorded state and a real part of relative dielectric constant of the recording material in an unrecorded state is equal to or smaller than −5 and the other is larger than −5 with respect to wavelength of the reproduction light.

20. The optical information reproduction device according to claim 18, wherein a distal end portion of the particle includes a pointed cross section or an arcuate cross section.

21. The optical information reproduction device according to claim 18, wherein the information recording medium further comprises, in an upper layer of the recording region, a protective layer of which dielectric constant has a real part with a positive sign.

22. The optical information reproduction device according to claim 3, wherein the resonance section is a distal end region of the plasmon resonance element.

23. The optical information reproduction device according to claim 9, wherein the flat section has a predetermined angle θ (θ>0°) with respect to a surface that is perpendicular to a surface of the information recording medium.

* * * * *